United States Patent [19]

Volpe et al.

[11] Patent Number: 5,776,565
[45] Date of Patent: Jul. 7, 1998

[54] HYBRID SOL-GEL BARRIER COATINGS

[75] Inventors: Raymond A. Volpe, Weathersfield, Conn.; Paul C. Lucas, Chester, N.Y.

[73] Assignee: International Paper Company, Purchase, N.Y.

[21] Appl. No.: 753,975

[22] Filed: Dec. 4, 1996

[51] Int. Cl.$^6$ .................. B32B 9/04; B32B 9/06; C08G 77/18; C08G 77/02

[52] U.S. Cl. .................. 428/34.2; 428/34.3; 428/447; 428/451; 428/452; 522/84; 522/99; 528/32; 528/38; 528/39; 524/837

[58] Field of Search .................. 522/84, 172, 170, 522/83, 99; 528/14, 15, 16, 17, 18, 19, 32, 38, 39; 428/34.2, 34.3, 447, 451, 452; 524/837

[56] References Cited

U.S. PATENT DOCUMENTS

| | | | |
|---|---|---|---|
| 4,206,249 | 6/1980 | Suzuki et al. | 427/54.1 |
| 4,229,228 | 10/1980 | Rotenberg et al. | 106/287.14 |
| 4,486,504 | 12/1984 | Chung | 428/412 |
| 4,699,802 | 10/1987 | Nakos et al. | 427/54.1 |
| 4,966,812 | 10/1990 | Ashley et al. | 428/412 |
| 5,009,924 | 4/1991 | Wyman | 427/44 |
| 5,077,135 | 12/1991 | Wyman | 428/447 |
| 5,086,087 | 2/1992 | Misev | 522/84 |
| 5,096,738 | 3/1992 | Wyman | 427/44 |
| 5,204,381 | 4/1993 | Zeigler | 522/148 |
| 5,221,560 | 6/1993 | Perkins et al. | 427/515 |
| 5,296,295 | 3/1994 | Perkins et al. | 428/412 |
| 5,340,620 | 8/1994 | Lucas | 427/515 |
| 5,348,771 | 9/1994 | Lee et al. | 427/515 |
| 5,360,834 | 11/1994 | Popall et al. | 522/36 |
| 5,366,545 | 11/1994 | Yajima et al. | 106/286.4 |
| 5,385,955 | 1/1995 | Tarshiani et al. | 522/31 |
| 5,510,147 | 4/1996 | Volpe | 427/397.7 |
| 5,618,628 | 4/1997 | Volpe | 428/450 |

*Primary Examiner*—Susan W. Berman
*Attorney, Agent, or Firm*—Roberts & Mercanti, L.L.P.

[57] ABSTRACT

Hybrid sol-gel barrier coatings are produced by hydrolyzing a tetrafunctional alkoxide silicate and a silane having one or two pendant crosslinkable groups in water or water plus a water miscible organic solvent and a catalytic amount a protic acid, Lewis acid, or metal chelate, until a viscosity of from about 2,600 to about 3,200 cps is obtained. The product is then diluted water or water plus a water miscible organic solvent, optionally containing a protic acid, Lewis acid, or metal chelate, until a viscosity of about 0.5 to about 10 cps is obtained. The diluted product is blended with a photoinitiator, coated onto a substrate, dried and irradiated to obtain oxygen barrier films having a very low oxygen transmission rate.

23 Claims, No Drawings

HYBRID SOL-GEL BARRIER COATINGS

BACKGROUND OF THE INVENTION

1. Field of the Invention

The present invention relates to hybrid sol-gel barrier coatings. More particularly, the invention pertains to sol-gel coatings produced from a hydrolyzed mixture of a tetrafunctional alkoxide silicate and a silane having one or two pendant crosslinkable groups, which after ripening to a viscosity of 2,600–3,200 and dilution to a viscosity of about 1 cps, is crosslinked by a photoinitiator to obtain oxygen barrier films having a very low oxygen transmission rate.

2. Description of the Prior Art

It is known in the art that oxygen barrier coatings may be produced by thermal evaporation of silica dioxide or plasma enhanced chemical vapor deposition of organo silicones onto substrates. These processes are expensive due to materials costs or processing costs. U.S. Pat. No. 5,084,356 illustrates vapor depositing silicon dioxide onto a substrate. An alternate method of producing silica films is by the sol-gel process. Typical methods are exemplified by U.S. Pat. Nos. 5,318,857; 5,186,745; 5,091,009; 5,013,588; 4,997,482; 4,385,086; 4,361,598; 5,096,738; 5,091,224; 4,614,673 which illustrate the coating of a monomer followed by an in-situ cure which requires a heating step. The process of the present invention produces an improved glass-like coated polymer film by the sol-gel method to obtain a film having an exceedingly low oxygen transmission. According to the inventive process, a sol-gel composition is formed by hydrolyzing a tetrafunctional alkoxide silicate and a silane having one or two pendant crosslinkable groups, in an aqueous solution including a protic acid, Lewis acid or metal chelate catalyst to produce a pre-crosslinked polymer composition having a viscosity of about 2,600 to about 3,200 cps. The crosslinked polymer is then diluted without depolymerizing it to a viscosity of about 1 cps. After mixing with a photoinitiator, the composition is then coated on a substrate and dried. After exposure to actinic radiation, a composition which has an oxygen transmission rate of less than about 20 $cm^3/m^2/day$ at 75% relative humidity and at room temperature is obtained.

Other sol-gel processes are known in the art. U.S. Pat. No. 4,842,901 precondenses tetraethyl ortho silicate, water, acid and a $C_4$ or higher alcohol, deposits on a substrate and dries, however there is no redilution to relax the polymer. U.S. Pat. No. 4,966,812 shows a reliquification by an ultrasonic breaking of polymer bonds with subsequent dilution, however, there is no dilution of a fully condensed polymer composition. U.S. Pat. No. 4,842,837 discloses hydrolyzing alkoxysilane with an alkaline catalyst and U.S. Pat. Nos. 5,328,645; 4,741,778; and 4,789,563 show the use of an alkaline hydrolysis or condensation. However, alkaline catalysts form polymer particles which produce a non-uniform coating. None of the foregoing patents disclose preformation of a polymer by hydrolyzing a mixture of a tetrafunctional alkoxide silicate and a crosslinkable silane, redilution, blending with a photoinitiator, coating, drying and irradiating the polymer composition on a substrate. U.S. Pat. No. 5,340,620 teaches a composition produced by hydrolyzing a silane to form a silanol, blending with a photoinitiator, coating onto a substrate and irradiating. However, this reference does not use a tetrafunctional alkoxide silicate.

The oxygen barrier film on the substrate produced according to this invention is stable to heat and moisture, is extremely thin (<0.1 micron) and has a preferred oxygen transmission rate of less than about 20 $cm^3/m^2/day$, and more preferably less than about 1 $cm^3/m^2/day$ at 75% relative humidity and at room temperature. The oxygen barrier film on the substrate is produced without the need for high curing temperatures.

SUMMARY OF THE INVENTION

The invention provides a method of producing a sol-gel composition which comprises (a) hydrolyzing a mixture of a tetrafunctional alkoxide silicate, and a silane which is substituted to have one or two pendant crosslinkable groups, in an aqueous solution comprising water or water plus a water miscible organic solvent and a catalytic amount of at least one catalyst selected from the group consisting of a protic acid, a Lewis acid, and a metal chelate, until a viscosity of from about 2,600 to about 3,200 cps is obtained to thereby produce a sol-gel polymer containing composition;

(b) diluting the product obtained from step (a) and effecting substantially complete hydrolysis of any residual alkoxyl groups thereof by diluting it with water or water plus a water miscible organic solvent, optionally containing one or more components selected from the group consisting of a protic acid, a Lewis acid and metal chelate, until a viscosity of about 0.5 to about 10 cps is obtained while not depolymerizing said sol-gel polymer; and (c) blending the product obtained from step (b) with a photoinitiator.

The invention also provides a method of producing an article which comprises coating and drying a layer comprising the above composition onto a smooth substrate, and then irradiating the composition to sufficient actinic radiation to effect crosslinking of the composition.

DETAILED DESCRIPTION OF THE PREFERRED EMBODIMENT

A sol-gel composition is formed by hydrolyzing a mixture of a tetrafunctional alkoxide silicate, and a silane which is substituted to have one or two pendant crosslinkable groups.

The tetrafunctional alkoxide silicates useful for this invention include tetra-$C_1$, to $C_9$ alkyl orthosilicates although the most preferred are tetraethyl orthosilicate (TEOS) and tetramethyl orthosilicate.

The silanes are substituted to have one or two pendant crosslinkable groups, wherein the crosslinkable groups can be, for example, an epoxy, acrylic, methacrylic, vinyl or styrenic group. The most preferred silanes are 3-glycidoxypropyltrimethoxysilane, g-methacryloxypropyltrimethoxysilane, N-2-(vinylbenzylamino)-ethyl-3-aminopropyltrimethoxysilane.monohydrogen chloride which are respectively available from Dow Corning as Z-6040, Z-6030 and Z-6032 Silanes. The silane is present in the mixture with the tetrafunctional alkoxide silicate and silane in an amount of from about 5 weight percent to about 25 weight percent, preferably from about 5 weight percent to about 10 weight percent based on the combined weight of the tetrafunctional alkoxide silicate and silane.

The mixture of tetrafunctional alkoxide silicate and silane is then hydrolyzed in an aqueous solution comprising water or water plus a water miscible organic solvent, preferably a $C_1$ to $C_4$ alcohol and more preferably ethanol. The hydrolysis converts the alkoxy group to a hydroxy group and this latter then polymerizes and crosslinks. The hydrolysis is conducted with a catalyst which can be a protic acid, a Lewis acid, a metal chelate, or a mixture thereof. Lewis acids non-exclusively include aluminum chloride, iron chloride and zinc chloride. Protic acids include hydrochloric acid, nitric acid and acetic acid among others. Metal chelates include beta diketones such as aluminum, chromium and zirconium acetylacetonate. The hydrolysis may be conducted in two stages by first hydrolyzing with the protic acid and then with the Lewis acid or metal chelate. The hydrolysis is conducted until a viscosity of from about 2,600 to about 3,200 cps is obtained to produce a crosslinked sol-gel polymer composition. This usually takes from about three to about five days. The catalyst is present in that amount sufficient to catalyze the condensation and crosslinking. The catalyst is preferably present in an amount of from about 0.5% to about 10% by weight of the combined tetrafunctional alkoxide silicate and silane, more preferably from about 2% to about 6%.

After the gel has condensed, it is then diluted with water or a or water plus a water miscible organic solvent, preferably a $C_1$ to $C_4$ alcohol and more preferably ethanol. Preferred dilution is with a 50/50 mixture of water/ethanol from about one to about four times. This solution may also contain the protic acid, Lewis acid or metal chelate to bring the condensation reaction to completion. The dilution serves to relax the condensed polymer without causing a depolymerization. The preferred viscosity ranges from about 0.5 cps to about 10 cps, preferably about 0.5 to about 1.5 cps and most preferably about 1 cps. The relaxed sol-gel polymer composition has substantially no polymer particles visible to the unaided eye. This process improves on prior art processes which merely condense until a low viscosity of about 10 cps is obtained. The prior processes inherently produce coatings with visible polymer particles and no significant improvement in oxygen transmission rate. The thusly produced composition is then blended with a photoinitiator which is a free radical initiator or a cationic initiator capable of crosslinking the sol-gel composition upon irradiating to sufficient actinic radiation, such as ultraviolet or electron beam radiation. Suitable photoinitiators non-exclusively include acetophenones, benzophenones, triazines, benzoins, benzoin ethers, xanthones, thioxanthones, acridines and benzoquinones as are well known in the art. The most preferred photoinitiators are IRGACURE 184, a free radical which is commercially available from Ciba Geigy and DEGACURE KI85, a cationic photoinitiator which is commercially available from Degussa. The photoinitiator is preferably present an amount of from about 0.01 mol percent to about 0.1 weight percent, based on the amount of silane in the composition mixture. The relaxed sol-gel composition may additionally comprising a colorant such as a uv or infrared absorbing dye.

The solution is then coated down onto a smooth substrate which is preferably substantially non-porous. Typical substrates non-exclusively include glass, metals, polyesters such as polyethylene terephthalate, polyethylene, polyolefins such as polypropylene, cellulosic polymers such as cellulose acetate butyrate, among many others. Thereafter, the solution is dried. The drying is effective to evaporate and substantially remove the water and alcohol solvents, however, there is substantially no additional condensation or curing of the crosslinked polymer. In the preferred embodiment, the drying is conducted in the absence of applied heat. The temperature is not critical and may range from about 10° C. to about 130° C. depending on economical drying times, but preferably drying is conducted at about room temperature. The dried coating is then irradiated with a sufficient amount of actinic radiation to crosslink the dried coating. The coated substrate preferably has an oxygen transmission rate of less than about 20% that of the uncoated substrate. Preferably the coated substrate has an oxygen transmission rate of less than about 20 $cm^3/m^2/day$, more preferably less than about 10 $cm^3/m^2/day$, still more preferably less than about 1 $cm^3/m^2/day$, and most preferably from about 0.05 to about 1 $cm^3/m^2/day$ as calculated by ASTM D-3985. The substrate is coated with a substantially uniform coating of the sol-gel polymer composition at a thickness not in excess of that which would provide a substantially crack-free layer on the substrate when dried. The dried, substantially uniform coating on the substrate is one which is substantially crack free and has a preferred thickness of about 1 micron or less, preferably 0.5 micron or less and more preferably about 0.2 micron or less. It may optionally comprises more than one layer of the polymer composition. Suitable substrates can be glass, metal, polyesters, polyethylenes, polyolefins, nylons, a cellulosic polymer or the like.

An additional polymeric film may be adhered to the coated substrate either on the coating side or the other surface of the substrate. The polymeric film may either be adhered with an adhesive, laminated, or the film can be inherently heat sealable.

It is also within the contemplation of the invention that one can adhere a paper or paperboard stratum to another surface of the polymeric film. Any of the forgoing constructions can be formed into the shape of a container by forming an enclosure therewith having a plurality of side walls. The constructions are preferably formed by folding a large sheet of the construction into the desired container. The container has the same low oxygen transmission rate since the folding process does not cause the inventive layer to crack. As a result the container itself has an oxygen transmission rate of less than about 20 $cm^3/m^2/day$ at 75% relative humidity and at room temperature.

The following non-limiting examples serve to illustrate the invention.

EXAMPLE 1

A hydrolysis was carried out by mixing 92 grams of ethanol, 198 grams of tetraethoxy orthosilicate, 10 grams of a Dow Corning Z-Silane as indicted in Table 1, 90 grams of water and 2.5 grams of concentrated hydrochloric acid. The solution was stirred and aged until the Brookfield viscosity (#4 spindle @ 50 rpm) of the solution was 2,600 to 3,200 cps, approximately 72 hours. There were no visible signs of any particles in solution. At this point the viscous solution was diluted four fold with a 50:50 solution of water/ethanol. 2 g of the indicated photoinitiator are then added. The solution was visibly clear and had a viscosity of 1 cp. The solution was coated down onto 48 gauge PET film with a #7 wire wound rod and air dried. The dried film was then passed under a medium pressure mercury arc uv lamp (270 $mJ/cm^2$ at a web speed of 40 feet per minute) for the indicated number of passes to initiate the crosslinking reaction. The resultant oxygen transmission rate is measured at 75% Relative Humidity at room temperature.

TABLE 1

| Silane | Photoinitiator | No. of passes under UV Lamp | Oxygen Transmission Rate |
|---|---|---|---|
| Z-Silane 6030 | Irgacure 184 | 1 | 82 |
| Z-Silane 6030 | Irgacure 184 | 1 | 94 |
| Z-Silane 6030 | Irgacure 184 | 2 | 97 |
| Z-Silane 6030 | Irgacure 184 | 2 | 116 |
| Z-Silane 6032 | Irgacure 184 | 1 | 18 |
| Z-Silane 6032 | Irgacure 184 | 1 | 16 |
| Z-Silane 6032 | Irgacure 184 | 2 | 125 |
| Z-Silane 6032 | Irgacure 184 | 2 | 86 |
| Z-Silane 6040 | Degacure KI85 | 2 | 18 |
| Z-Silane 6040 | Degacure KI85 | 2 | 18 |
| Z-Silane 6040 | Degacure KI85 | 1 | 68 |
| Z-Silane 6040 | Degacure KI85 | 1 | 90 |

EXAMPLE 2

A hydrolysis was carried out by mixing 92 grams of ethanol, 198 grams of tetraethoxy orthosilicate, 20 grams of a Dow Corning Z-Silane as indicted in Table 2, 90 grams of water and 2.5 grams of concentrated hydrochloric acid. The solution was stirred and aged until the Brookfield viscosity (#4 spindle @ 50 rpm) of the solution was 2,600 to 3,200 cps, approximately 72 hours. There were no visible signs of any particles in solution. At this point the viscous solution was diluted four fold with a 50:50 solution of water/ethanol. 4 g of the indicated photoinitiator are then added. The solution was visibly clear and had a viscosity of 1 cp. The solution was coated down onto 48 gauge PET film with a #7 wire wound rod and air dried. The dried film was then passed under a medium pressure mercury arc uv lamp (270 mJ/cm$^2$ at a web speed of 40 feet per minute) for the indicated number of passes to initiate the crosslinking reaction. The resultant oxygen transmission rate is measured at 75% Relative Humidity at room temperature.

TABLE 2

| Silane | Photoinitiator | No. of passes under UV Lamp | Oxygen Transmission Rate |
|---|---|---|---|
| Z-Silane 6030 | Irgacure 184 | 1 | 98 |
| Z-Silane 6030 | Irgacure 184 | 1 | 95 |
| Z-Silane 6030 | Irgacure 184 | 2 | 94 |
| Z-Silane 6030 | Irgacure 184 | 2 | 93 |
| Z-Silane 6032 | Irgacure 184 | 2 | 89 |
| Z-Silane 6032 | Irgacure 184 | 2 | 93 |
| Z-Silane 6032 | Irgacure 184 | 1 | 0.174 |
| Z-Silane 6032 | Irgacure 184 | 2 | 16 |
| Z-Silane 6040 | Degacure KI85 | 2 | 5.87 |
| Z-Silane 6040 | Degacure KI85 | 1 | 0.206 |
| Z-Silane 6040 | Degacure KI85 | 2 | 95 |

What is claimed is:

1. A method of producing a sol-gel composition which comprises
    (a) hydrolyzing a mixture of a tetrafunctional alkoxide silicate, and a silane which is substituted to have one or two pendant crosslinkable groups, in an aqueous solution comprising water or water plus a water miscible organic solvent and a catalytic amount of at least one catalyst selected from the group consisting of a protic acid, a Lewis acid, and a metal chelate, until a viscosity of from about 2,600 to about 3,200 cps is obtained to thereby produce a sol-gel polymer containing composition;
    (b) diluting the product obtained from step (a) and effecting substantially complete hydrolysis of any residual alkoxyl groups thereof by diluting it with water or water plus a water miscible organic solvent, optionally containing one or more components selected from the group consisting of a protic acid, a Lewis acid and metal chelate, until a viscosity of about 0.5 to about 10 cps is obtained while not depolymerizing said sol-gel polymer; and
    (c) blending the product obtained from step (b) with a photoinitiator.

2. The method of claim 1 wherein the tetrafunctional alkoxide silicate is a tetra $C_1$ to $C_9$ alkyl ortho silicate.

3. The method of claim 1 wherein the tetrafunctional alkoxide silicate comprises tetraethyl orthosilicate or tetramethyl ortho silicate.

4. The method of claim 1 wherein the crosslinkable groups of the silane are selected from the group consisting of epoxy, acrylic, methacrylic, vinyl or styrenic groups.

5. The method of claim 1 wherein the silane is selected from the group consisting of 3-glycidoxypropyltrimethoxysilane, g-methacryloxypropyltrimethoxysilane, N-2-(vinylbenzylamino)-ethyl-3-aminopropyltrimethoxysilane.monohydrogen chloride.

6. The method of claim 1 wherein the silane is present in the mixture with the tetrafunctional alkoxide silicate and silane in an amount of from about 5 weight percent to about 25 weight percent based on the combined weight of the tetrafunctional alkoxide silicate and silane.

7. The method of claim 1 wherein the silane is present in the mixture with the tetrafunctional alkoxide silicate and silane in an amount of from about 5 weight percent to about 10 weight percent based on the combined weight of the tetrafunctional alkoxide silicate and silane.

8. The method of claim 1 wherein the catalyst comprises one or more components selected from the group consisting of hydrochloric acid, nitric acid, acetic acid, aluminum chloride, iron chloride, zinc chloride, aluminum, chromium and zirconium acetylacetonate.

9. The method of claim 1 wherein the water miscible organic solvent is a $C_1$ to $C_4$ alcohol.

10. The method of claim 1 wherein the photoinitiator is a free radical initiator or a cationic initiator capable of crosslinking the sol-gel composition upon irradiating with sufficient actinic radiation.

11. The method of claim 10 wherein the actinic radiation is ultraviolet or electron beam radiation.

12. The sol-gel composition produced by the method of claim 1.

13. A method of producing an article which comprises coating and drying a layer comprising the composition of claim 1 onto a smooth substrate, and then irradiating the composition with sufficient actinic radiation to effect crosslinking of the composition.

14. The method of claim 13 wherein the substrate comprises glass, metal, polyester, polyethylene, polyolefin or a cellulosic polymer.

15. The method of claim 14 further comprising adhering a surface of a polymeric film either to the substrate or to the coated and dried layer.

16. The method of claim 15 wherein the polymeric film is either adhered with an adhesive or laminated to the substrate or to the coated and dried layer.

17. The method of claim 15 wherein the polymeric film comprises one or more components selected from the group consisting of polyethylene, polyester, polypropylene, nylon and cellulosic polymers.

18. The method of claim 15 wherein the polymeric film comprises one or more food grade components selected from the group consisting of polyethylene, polyester, polypropylene, nylon and cellulosic polymers.

19. The method of claim 15 further comprising adhering a paper or paperboard stratum to another surface of the polymeric film.

20. The article produced by the method of claim 13.

21. The article of claim 20 which has an oxygen transmission rate of less than about 20 cm$^3$/m$^2$/day at 75% relative humidity and at room temperature.

22. The article of claim 20 which has an oxygen transmission rate of less than about 1 cm$^3$/m$^2$/day at 75% relative humidity and at room temperature.

23. A container which comprises an enclosure having a plurality of side walls, which side walls comprise the article of claim 20.

* * * * *